INVENTORS
PAUL S. HEILER
ANDREW P. YESUL
BY Ronald Zibelli
ATTORNEYS

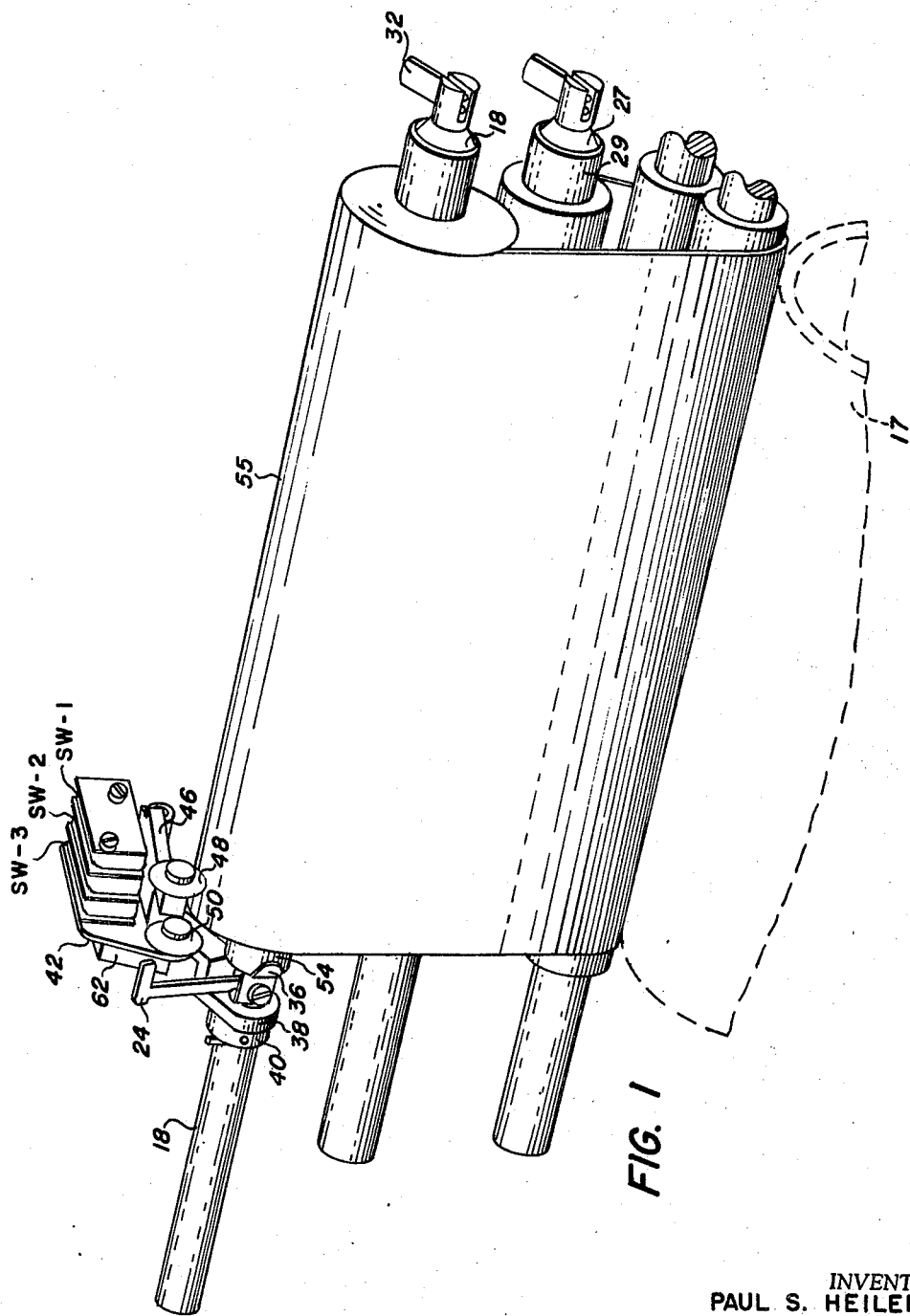

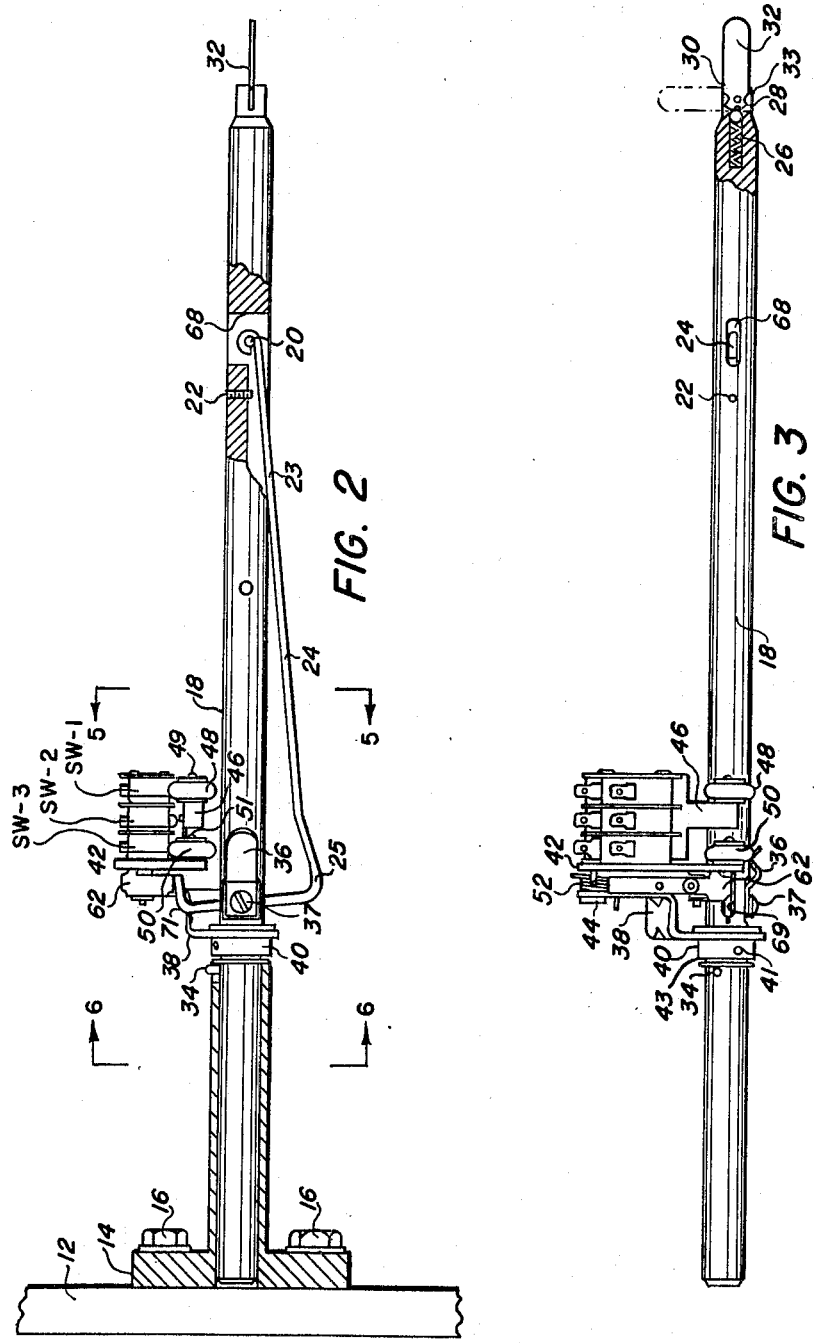

United States Patent Office 3,492,732
Patented Feb. 3, 1970

3,492,732
WEB QUANTITY INDICATOR
Paul S. Heiler, Fairport, and Andrew P. Yesul, Penfield, N.Y., assignors to Xerox Corporation, Rochester, N.Y., a corporation of New York
Filed Oct. 23, 1967, Ser. No. 677,141
Int. Cl. G01b 5/00
U.S. Cl. 33—172                                      7 Claims

ABSTRACT OF THE DISCLOSURE

Apparatus for sensing a quantity of web material supported on a supply roll in which a pair of follower members engageable with the circumferential surface of the web and the web support respectively sense a differential quantity of the web material and according to predetermined conditions, provide an indication thereof. The web sensing mechanism is automatically reset to the initial condition when a new supply of web material is placed on the support.

BACKGROUND OF THE INVENTION

This invention relates generally to apparatus for sensing a quantity of web material on a supply roll and more particularly to apparatus for firstly sensing a low condition of the web material on a supply roll and providing an indication thereof and for secondly sensing a depleted condition of the web material and providing an indication thereof.

Many types of machines utilize, process, or handle in some manner, quantities of continuous web material in which the web is wound upon a hollow core or support. Depending upon the type of machine, the particular mode being utilized, and the application thereof, the web materials may range for example, from paper, cellophane, plastic film, packaging material, and foil, to soft absorbent material or the like.

In machines, which utilize such web materials either in total or as a part of the operation it is highly desirable for the operator of the machine to know when the supply of web material reaches a low condition. This enables the operator to have a new supply of web material ready for placement into the machine when the old supply is depleted. It is also desirable to know when the supply is depleted after a low indication to eliminate waste in prematurely replacing the web supply before being entirely depleted.

In some instances where automatic and semi-automatic machines are utilized, the operator in charge thereof may not remain at the machine at all times. This is oftentimes due to the fact that a single operator may be in charge of several machines or have other duties which require that the machine be unattended during at least a portion of the operation. In these instances it is therefore very desirable for the operator to be able to make periodic checks to determine whether the machine is functioning properly and if the web supply is adequate.

In some xerographic machines a web of clean, soft, fibrous material is advanced in contact over a portion of the surface of the xerographic plate to remove residual powder particles therefrom. In such machines the web is advanced to a take-up support from a supply support by an appropriate drive mechanism. In these machines the used web cleaning material after being withdrawn from the supply roll to the take-up roll must be periodically replaced by a fresh clean supply for proper operation of the xerographic machine. In many such machines the operator has no indication that the web supply is low or depleted until the copy quality is substantially affected.

The operator then replaces the used web and continues the operation.

Operation in this manner often results in much down time of the machine which proves inefficient through ineffective utilization of the machine and which can result in much added expense. For example, in facsimile transmission equipment, information is transmitted from one location to another via a suitable transmitting medium. At the receiving location this information may be printed xerographically onto a suitable recording medium. In these machines a soft fibrous web is utilized to remove the residual powder particles from the xerographic plate. In such a system the transmitting medium can be rather expensive to the user. Thus, it is highly desirable to utilize the medium in the most efficient manner.

One way in which this can be achieved is to avoid any down time of the machine due to an inadequate supply of the web.

This may be accomplished by providing a web cleaning apparatus in which the supply of web material can be quickly and easily replaced without difficulty by the operator and which provides an accurate indication to the operator when the web material reaches firstly a predetermined low condition and secondly a depleted condition.

Web sensing systems which provide both an indication of a low condition and also a nearly depleted condition are known. However, these systems are not readily adaptable to all types of web material. For example, in one such apparatus, an end face of a wound roll of web material bears against a pair of switch actuators in a cheek plate which rotates with the roll. The actuators are positioned at different radial positions from the center support and as the web continues to be unwound from the support the actuators are eventually free to axially move under a bias thus rendering an indication of the status of web. This arrangement however, does not lend itself to making an accurate indication and there may be a considerable quantity of web remaining on the roll when a depleted condition is indicated. In such arrangements the roll must be accurately positioned against the cheek plate and held in close contact therewith throughout operation. This arrangement also requires that the web be of a non-deformable material while held on the roll to properly position the switch actuators and is not readily adaptable for soft fibrous material. Moreover, this arrangement requires a complex electrical system to connect the switches which rotate with the roll to their respective indicators.

SUMMARY OF THE INVENTION

Accordingly it is is an object of the invention to accurately indicate a quantity of web material contained on a supply roll.

It is another object of the invention to provide apparatus for indicating firstly a predetermined low condition of web material on a supply roll and secondly a depleted condition of web material on a supply roll.

It is another object of the invention to provide apparatus having means to sense a quantity of web material supported thereon which does not require precise positioning of the web in relation to the sensing means.

It is another object of the invention to provide web supporting apparatus in which rolls of web material may be quickly and easily removed and replaced.

It is another object of the invention to provide apparatus for supporting web material having means to sense a quantity of material contained thereon in which the sensing means is automatically reset to an initial condition when the web material is placed thereon.

These and other objects of the invention are attained by apparatus having means to support a supply roll of web material and having sensing means engageable with the circumferential surface of the web on the supply roll, operative for providing indications of first and second predetermined quantities of web material contained thereon. A reset means connected to the support is engageable with the sensing means to automatically reset the sensing means to an initial condition when a new supply of web material is placed thereon.

Other objects of the invention will become readily apparent to those skilled in the art in view of the following detailed disclosure and description thereof, especially when read in conjunction with the accompanying drawings.

BRIEF DESCRIPTION OF THE DRAWINGS

FIG. 1 is a perspective view of the web sensing mechanism as adapted for use in a xerographic machine.

FIG. 2 is a front elevational view of the web support and sensing apparatus.

FIG. 3 is a plan view of the web support and sensing apparatus.

DESCRIPTION OF THE PREFERRED EMBODIMENTS

Figure 4:
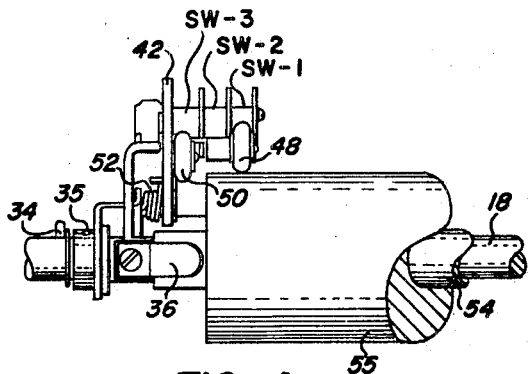
FIG. 4 is a front elevation of the sensing apparatus engaging a roll of web material.

With reference to FIGS. 1 and 4, a quantity of web material 55 is wound on a hollow cylindrical web support member 54 which is supported on one portion of main support shaft 18. As illustrated in FIG. 2, main support shaft 18 may be mounted for operation in a machine via a flanged collar member 14 connected to machine frame plate 12 by bolts 16 or other suitable fastening means. Main support shaft 18 is axially received by flanged collar member 14 with annular ring member 43 which is connected to shaft 18 in axial abutment therewith. A radially extending alignment pin 34 projecting from shaft 18 is received by an axially extending slot in collar member 14 to provide the proper angular alignment of shaft 18 in the machine.

An offset mounting arm 38 is rigidly connected to shaft 18 via bushing 40 and pin 35 or other suitable fastening means. A plate member 42 is pivotally connected to mounting arm 38 via stub shaft 44. Plate member 42 is normally biased in the clockwise direction as viewed in FIG. 6 by a torsion spring 52 engaging mounting arm 38 and pin 56 in plate member 42.

A generally L-shaped camming lever 62 is pivotally connected to plate member 42 on one side thereof via pivot pin 58 and C-ring 59 or other suitable fastening means. Camming lever 62 includes a first camming surface 61 generally tangential to but spaced from shaft 18 and a second camming surface 63 inclined at an angle from camming surface 61, the purposes of which will be hereinafter more fully explained. A leaf spring 64 connected to camming lever 62 via mounting screw 65 or other suitable fastening means engages a stop member 60 on one side thereof normally biasing camming lever 62 counterclockwise as viewed in FIG. 6. Stop member 60 is engaged on the other side thereof by an adjusting screw 66 in camming lever 62 to limit the counterclockwise rotation of camming lever 62 about pivot pin 58.

Figure 5:
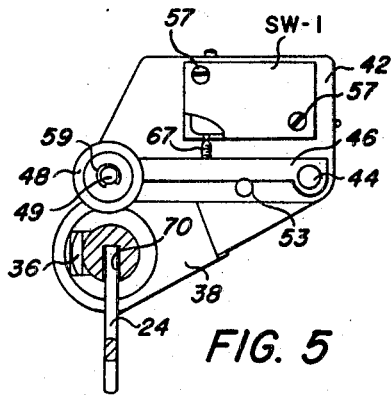
FIG. 5 is a sectional view taken along the lines 5—5 of FIG. 2.

A plurality of switches SW–1, SW–2 and SW–3 are connected in an array to plate member 42 on the side opposite camming lever 62 via mounting screws 57. A roller member 50 connected to plate member 42 via stub shaft 51 and C-ring 59 is engageable with the periphery of shaft 18 to limit the counterclockwise displacement of plate member 42 about stub shaft 44 as viewed in FIG. 5. A switch actuator arm 46 is pivotally mounted at one end thereof about stub shaft 44 which projects through plate member 42. A roller member 48 is connected at the other end of switch actuator arm 46 via stub shaft 49 and C-ring 59 and is also engageable with the periphery of shaft 18. A plurality of adjustable stop members 67 in switch actuator arm 46 are positioned to engage the actuators of the respective switches. A stop member 53 connected to plate member 42 limits the counterclockwise rotation of switch actuator arm 46 about stub shaft 44 when plate member 42 is pivoted clockwise about stub shaft 44 as viewed in FIG. 5.

A lever arm 24 having a first camming surface 23 and a second camming surface 25 is pivotally connected at one end to shaft 18 in slot 68 via pivot pin 20. Lever arm 24 extends at the other end thereof through slot 69 in shaft 18 and has a cam engaging surface 71 thereat which is engageable with the camming surfaces 61 and 63 of camming lever 62. A groove 70 extends between slots 68 and 69 in shaft 18 to receive lever arm 24 when a roll of web material 55 is held in place on shaft 18. An adjustable stop member 22 in shaft 18 extends into groove 70 to limit the clockwise rotation of lever arm 24 about pivot pin 20 as seen in FIG. 2.

In the preferred embodiment the web-sensing mechanism is mounted as shown in FIG. 2 whereby lever arm 24 is biased in the counterclockwise direction by gravitational forces. However, spring biasing means may also be provided to facilitate other mounting positions.

A spring member 36 connected to shaft 18 via connecting screw 37 engages web support member 54 to limit the axial positioning of web material 55 on shaft 18 in one direction. A pivotal locking member 32 at the end of shaft 18 serves to limit axial displacement of the web material 55 in the other direction on shaft 18. Locking member 32 is pivotally mounted in a slot at the end of shaft 18 via pivot pin 30. A compression spring 26 axially mounted within shaft 18 biases a ball detent 28 into engagement with notches 33 in locking member 32 to detent locking member 32 in the locking and unlocked positions as shown in connection with FIG. 3.

Figure 7:
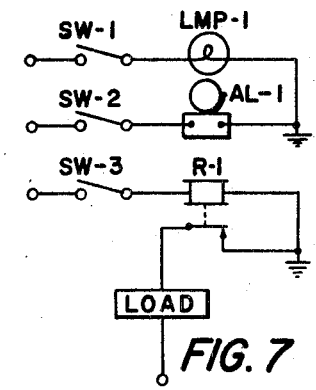
FIG. 7 is a schematic diagram of the electrical circuitry.

As shown in connection with FIG. 7, switches SW–1 and SW–2 are electrically connected to provide an indication when the web material 55 on shaft 18 reaches a low condition. As schematically illustrated therein, both visual and audible means are utilized to provide a positive indication of a low condition. Switch SW–3 is utilized to activate a relay to interrupt the machine operation when the supply of web material has been depleted.

Referring to FIG. 1, the invention is illustrated as adapted for use in a xerographic machine. The web cleaning material 55 which is utilized to clean the surface of a xerographic drum 17, is supported on main support shaft 18 and extends over the surface of xerographic drum 17 which is rotatably mounted about a shaft not shown. The web material 55 is advanced across the rotating surface of xerographic drum 17 onto a second web support member 29 similar to web support member 54 which in turn is supported on a support shaft 27 in the manner as described in connection with main support shaft 18. The web material 55 is wound onto web support 29 from web support 54 by means of a web advancing mechanism not shown.

With the web material 55 removed from the main support shaft 18, the web sensing and reset mechanisms are at the respective positions as illustrated in FIG. 2. As the web support member 54 with the web cleaning material 55 wound thereon is inserted onto shaft 18, the interior surface of web support member 54 contacts camming surface 23 of lever arm 24. As the web support member 54 is advanced toward the web sensing assembly, lever arm 24 is cammed in the clockwise direction as viewed in FIG. 2. As lever arm 24 moves clockwise, cam engaging surface 71 at the end of lever arm 24 engages camming surface 61 of camming lever 62. This action pivots camming lever 62 counterclockwise about pivot pin 58 whereby adjusting screw 66 contacts stop member 60. In this position plate member 42 with the web sensing mechanism attached thereto is pivoted to a first position counterclockwise about stub shaft 44 as viewed in FIG. 6. In this first position roller members 48 and 50 are spaced from main support shaft 18 sufficiently to admit the wound web material 55 therebetween. As web support member 54 is further advanced along shaft 18 the inside surface thereof contacts the second camming surface 25 of lever arm 24. This second camming surface produces an additional displacement of lever arm 24 and hence rotates plate member 42 and the connected web sensing mechanism about stub shaft 44 to a second rotated position. While being moved to the second rotated position, camming surface 61 becomes disengaged from cam engaging surface 71 on lever arm 24 due to the horizontal translation of cam lever 62 with respect to lever arm 24 as plate member 42 is rotated about stub shaft 44. As cam surface 61 becomes disengaged from cam engaging surface 71 plate member 42 and the web sensing mechanism is pivoted clockwise as viewed in FIG. 6 and counterclockwise as viewed in FIG. 5 under the bias of torsion spring 52. Torsion spring 52 thus biases plate member 42 and the web sensing mechanism to the position as illustrated in FIG. 4. In this position all of the switches SW–1, SW–2, and SW–3 are in the open position as illustrated in connection with FIG. 7.

As the supply of web material 55 is used from web support member 54, the diameter of the supply roll thus decreases lowering roller member 48 and roller member 50 toward shaft 18 as viewed in FIG. 4. As roller member 50 is lowered toward shaft 18 via switch actuator arm 46 and switches SW–1, SW–2, and SW–3, connected to plate member 42, roller member 50 is brought into contact with the rolling surface of web support member 54. In this position, a small quantity of web material 55 still remains on support member 54 and the respective roller members are at the same relative differential position as shown in FIG. 4. With roller member 50 in contact with the rolling surface of support member 54, as the supply of web material continues to be depleted, the differential positioning between roller members 50 and 48 will be changed. When roller member 48 reaches a first predetermined position with respect to roller member 50, switches SW–1 and SW–2 will be closed via switch actuator arm 46 and the respective adjusting screws 67. Thus upon closing of switches SW–1 and SW–2, the circuit is conditioned to provide current through the respective indicators. With the respective circuits closed lamp LMP–1 and alarm device AL–1 is activated to provide a signal that the quantity of web material 55 remaining on support member 54 is in a low condition. It should be noted that by properly positioning adjusting screws 67, switch SW–1 may be closed at a point in time preceding the closing of SW–2 to provide a first visual indication that the quantity of web material 55 is in a low condition and a second later in time audible indication that the quantity of web material 55 is in a low condition.

Figure 6:
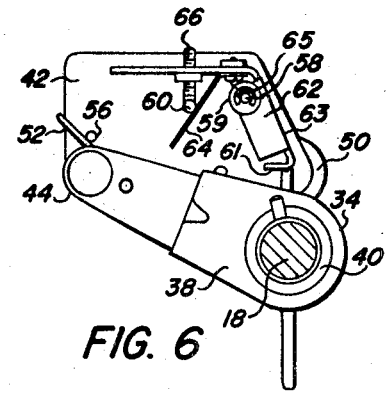
FIG. 6 is a sectional view taken along the lines 6—6 of FIG. 2.

Having received an indication that the quantity of web material 55 on support member 54 is in a low condition the operator in charge of the respective machine may then obtain a new quantity of web material to be inserted into the machine. In the meantime, however, the machine continues to function uninterrupted. As the last remaining quantity of web material 55 on support member 54 is withdrawn therefrom roller member 48 is lowered to the same relative position as roller member 50 which is riding in contact with the surface of support member 54. When this condition is reached switch SW–3 is moved to the closed position activating relay R–1 as seen in connection with FIG. 7. Relay R–1 is connected to the main power supply of the machine and when in the activated condition opens the circuit supplying power to the machine thus interrupting the operation. When this condition is reached the operator then removes the exhausted supply of web material 55 from the machine. As the web support member 54 is removed from shaft 18 and the inside surface thereof from contact with lever arm 24, lever arm 24 is pivoted counterclockwise as viewed in FIG. 2 under the bias thereon. As lever arm 24 is thus pivoted cam engaging surface 71 contacts camming surface 63 of camming lever 62 to pivot camming lever 62 clockwise against the bias of spring 64 as seen in FIG. 6. Thus as lever arm 24 is pivoted, camming lever 62 is likewise pivoted to allow lever arm 24 to return to the initial position. With lever arm 24 in the initial position, camming lever 62 is free to return to the initial position under the bias of leaf spring 64.

Thus, from the foregoing description, it may be seen that there is provided a novel web sensing and reset mechanism which provides firstly an accurate indication of a low condition of web material and secondly a depleted condition of the web material. It may be further seen that the web sensing mechanism is automatically reset to the initial sensing position when a new supply of the web material is inserted onto the main supply roll, which eliminates the necessity of manually positioning the sensing mechanism prior to insertion of a new quanity of web material.

While the invention has been described in connection with the structure disclosed herein, various modifications and changes may be made without departing from the spirit of the invention.

What is claimed is:

1. Apparatus for indicating a quantity of web material on a support member comprising,
   first sensing means engageable with said support member and operable to provide a first reference condition,
   second sensing means engageable with a quantity of web material on said support member and operable to provide a second reference condition,
   the difference between said first and said second reference conditions representing a quantity of web material on said support member,
   signal means for providing an indication of a predetermined selected relationship between said first and said second reference conditions, and
   means engageable with said second sensing means and actuated in response to the insertion of a quantity of web material onto said support member for positioning said second sensing means into contact with said quantity of web material.

2. Apparatus according to claim 1 wherein said predetermined selected relation occurs when a predetermined quantity of web material is on said support member.

3. Apparatus according to claim 1 wherein said predetermined selected relation occurs when the quantity of web material on said support member is exhausted.

4. An automatically resettable web sensing apparatus comprising in combination,
   a web sensing assembly having first sensing means engageable with a web support member to provide a first reference condition, and second sensing means engageable with a quantity of web material on a support member to provide a second reference condition, and
   linkage means engageable with said web sensing assembly to position said first and said second sensing means out of engagement with said support member and said web material, said linkage means being actuated in response to the insertion of a quantity of web material onto said support member.

5. Apparatus for indicating a quantity of web material on a support member comprising,
   first sensing means engageable with said support member and operable to provide a first reference condition,
   second sensing means engageable with a quantity of web material on said support member and operable to provide a second reference condition, the difference between said first and second reference conditions representing a quantity of web material on said support member, said difference changing as the quantity of web material on said support member changes, switch means connected to said first sensing means to be positioned according to said first reference condition, switch operating means connected to said second sensing means and operative to set said switch means to a condition in response to a predetermined change in the relative positions of said first and said second sensing means, electrically operated signal means for indicating the condition of said switch means, and electrical circuit means operatively connecting said switch means and said signal means.

6. Apparatus according to claim 5 further including, linkage means actuated in response to the insertion of a quantity of web material onto said support member for moving said second sensing means to a first position out of contact with said web material and to a second position into contact with said web material.

7. Apparatus according to claim 6 wherein said linkage means includes, a first lever arm pivotally connected at one end thereof to said support member and having an extended camming surface engageable with the inner-circumference of a roll of web material on said support member, a second lever arm pivotally connected to said first sensing means having a pair of camming surfaces thereon engageable with said first lever arm, and stop means connected to said first sensing means for engaging said second sensing means.

References Cited
UNITED STATES PATENTS
2,713,209   7/1955   Brown _____ 33—172

LEONARD FORMAN, Primary Examiner

F. J. D'AMBROSIO, Assistant Examiner

U.S. Cl. X.R.

340—259